April 25, 1950   A. G. BROOME ET AL   2,505,662
ANIMAL TRAP
Filed July 3, 1946   2 Sheets-Sheet 1
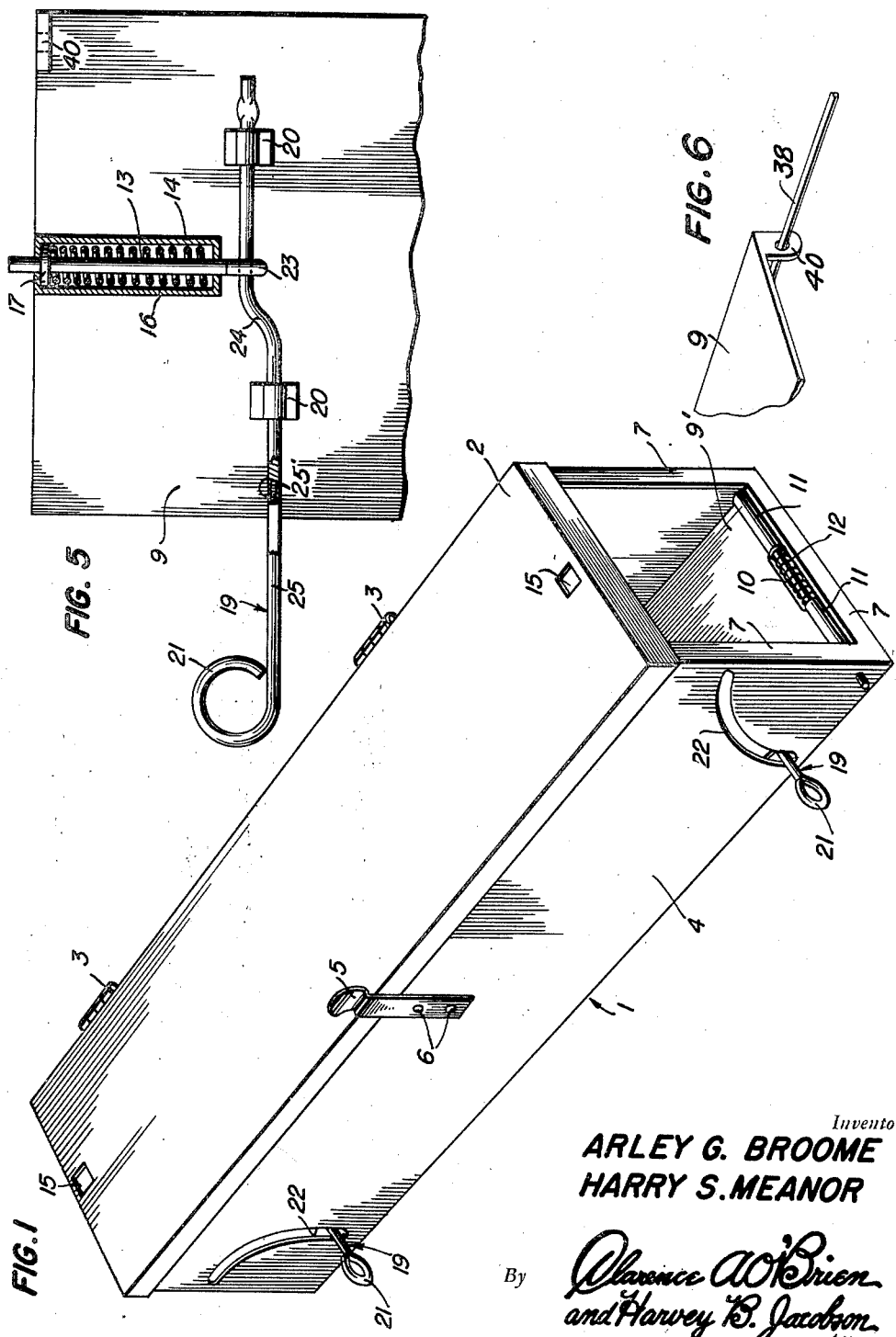
Inventors
ARLEY G. BROOME
HARRY S. MEANOR
By Clarence A. O'Brien
and Harvey B. Jacobson
Attorneys

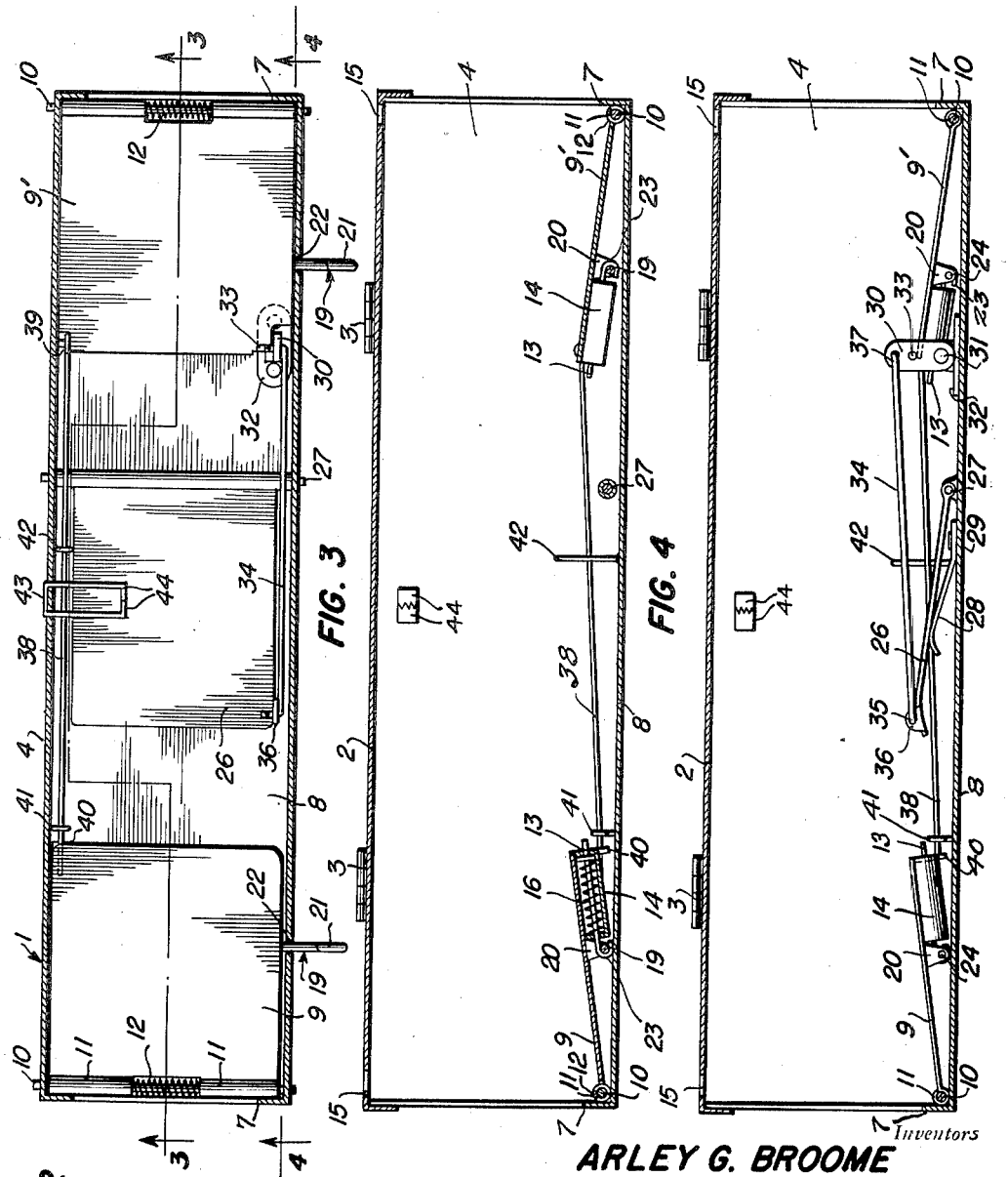

UNITED STATES PATENT OFFICE 2,505,662

ANIMAL TRAP

Arley G. Broome, Waco, and Harry S. Meanor, Center Point, Tex.

Application July 3, 1946, Serial No. 681,172

4 Claims. (Cl. 43—61)

Our invention relates to improvements in animal traps for catching, alive, various kinds of small animals.

The primary object of the invention is to provide a quick acting trap which is adapted for easy setting with safety and which is easy to bait and keep clean, will not injure the trapped animals, and is comparatively inexpensive to manufacture and use.

Other and subordinate objects, also comprehended by our invention, together with the precise nature of our improvements, and the manifold advantages thereof will be readily understood when the succeeding description and claims are read with reference to the drawings accompanying and forming part of this specification.

In said drawings:

Figure 1 is a view in perspective of our improved animal trap, in a preferred embodiment thereof, the trap being shown as set;

Figure 2 is a view in horizontal section,

Figure 3 is a view in vertical longitudinal section, taken on the line 3—3 of Figure 2, Figure 4 is a similar view taken on the line 4—4 of Figure 2, Figure 5 is a fragmentary view in elevation of one of the doors and part carried thereby drawn to a larger scale, and Figure 6 is a fragmentary view in perspective of the door with the ear thereon for receiving the latch rod.

Referring to the drawings by numerals, our improved animal trap, as shown, comprises, as its basic element, an elongated, rectangular, boxlike casing 1 open at the top and both ends thereof and provided with a flanged lid 2 hinged at one side thereof, as at 3, to one of the sides 4 of the casing. A spring catch 5 is fixed, as at 6, to the other side 4 of the casing 1 to snap over the lid 2 to fasten said lid closed. At the ends thereof, the casing 1 is provided with internal flanges 7 formed on the sides 4 and the bottom 8 of the casing and serving a purpose presently clear.

A pair of rectangular doors 9, 9' are hinged in the casing 1, adjacent the bottom 8 and ends thereof, to swing upwardly against the flanges 7 and close said ends. For hinging the doors 9, 9' a pair of hinge pintles 10 are suitably extended through the sides 4 and through pairs of spaced apart hinge barrels 11 on the bottom edges of the doors. Coil springs 12 provided on the pintles 10 between the hinge barrels 11 of the pairs, with ends suitably engaged with the doors 9, 9' and the bottom 8 urge said doors 9, 9' upwardly towards closing position.

Latch means are provided for maintaining the doors 9, 9' closed comprising a latch bolt 13 on the inner side of each door 9, 9' in the vertical center and adjacent the upper edge thereof, and which is slidably mounted in the ends of a barrel 14 suitably fixed to the door so that the latch bolt 13 may be projected past said upper edge of the door into a suitable aperture 15 provided in the lid 2 at the end thereof adjacent the door. A coil spring 16 in the barrel 14 of each latch bolt 13 bearing against one end of the barrel and a collar 17 on the latch bolt tends to project said bolt. The collar 17 engages the other end of the barrel 14 and limits projection of the latch bolt 13.

A latch releasing pull rod 19 is slidably mounted on each door 9, 9' in suitable keepers 20, and extends across the door and through one side 4 of the casing 1 with a looped finger grip outer end 21. The pull rods 19 extend through one side 4 by way of arcuate slots 22 in the sides permitting said rods to swing freely with the doors 9. Each pull rod 19 slidably extends through a hook 23 on one end of the adjacent latch bolt 13 and is bent to provide a cam section 24 on the pull rod adapted, when said rod is moved inwardly of the casing 1, to cam the latch bolt 13 into retracted unlatching position. The hooks 23 provide for independent retraction of the latch bolts 13 when said bolts engage the lid 2 so that the latch bolts 13 may snap into the apertures 15. A section 25 of the pull rods 19, with the finger grip end 21 thereon, is threaded into the remainder of the rod so that said section may be detached and will not protrude from the casing 1 if it is desired to place the trap in a restricted place. This threaded connection is indicated at 25' in Figure 5.

A rectangular treadle 26 is provided in the casing 1, intermediate the doors 9, 9' and which is vertically swingable on a pintle 27 extending across the casing 1 adjacent the bottom 8 with its ends suitably mounted in the sides 4 of said casing. A leaf spring 28 with one end secured, as at 29, to the bottom 8 of the casing 1, and with its other end bearing upwardly against the treadle 26 urges said treadle upwardly.

A trigger control is provided for holding one door 9' in downwardly swung open position, and which preferably has the form of a short upstanding link 30 pivoted, as at 31, on a bracket 32 suitably fixed to the bottom 8 of the casing 1, the link 30 having a lateral stud 33 thereon adapted to overlie one side edge of said door 9 adjacent the top edge of the door to hold said door open. The link 30 is swingable in one direction to move the stud 33 over said door 9' into door holding position, and is also swingable in the opposite direction to move said link 30 and stud 33 into door releasing position. A horizontal rod 34 pivoted at one end, as at 35, in a side edge lug 36 on the treadle 26 and with its other end pivoted, as at 37 to the link 30 operatively connects the treadle 26 to said link 30. As best shown in Figure 4, the spring 28 normally urges the treadle 26 into normal slightly inclined position, in which position of said rod, the link 30 and stud 33 are held thereby in door holding position.

The other door 9 is adapted to be releasably latched in down swung open position by means of an endwise movable latch rod 38 pivoted at one end, as at 39, on the edge of the trigger controlled door 9' opposite that on which the described trigger is located. The other end of said latch rod 38 is adapted to be slidably engaged in an apertured ear 40 on said other door and is guided in an eye member 41 on the bottom 8 of the casing 1, the arrangement being such that when both doors 9, 9' are swung down into open position, the ear engaging end of said latch rod 38 holds the ear equipped door 9 down but said latch rod 38 may be moved endwise by closing movement of the trigger controlled door 9' to which said rod is pivoted whereby said rod 38 is retracted out of said ear and the ear equipped door thereby released. A suitable keeper 42 on the bottom 8 of the casing 1 guides the latch rod 38 intermediate its ends during endwise movement of said rod.

A bait holder is provided in the form of a staple like clip 43 extended through one side 4 of the casing 1 in the transverse center of the casing, over the treadle 26 and having inner, resilient hooked ends 44 for spreading apart to interpose bait therebetween.

To set the described trap, with the lid 2 open, the ear equipped door 9 is moved into down swung open position established by engagement of the hook end 23 of its latch bolt 13 with the bottom 8 of the casing 1. With said door held down, the trigger controlled door 9' is swung into partly open position sufficiently to cause the latch rod 38 to be projected into the ear 40, whereby the ear equipped door is latched down and open. The treadle 26 is then depressed to cause the link 30 and the stud 33 to be swung, in a manner which will be clear, into door releasing position, and said trigger controlled door 9' is then swung into fully opened position. At this point, the treadle 26 is released to be swung upwardly by the spring 28 into normal position, whereby, through the medium of the rod 34 swinging the link 30 and stud 33 into door holding position, previously described, the trigger controlled door 9' is held open.

As will be clear, an animal entering the casing 1 from either end thereof, and stepping on the treadle 26, will depress the treadle from normal position, and depression of the treadle 26 will cause the rod 34 to swing the link 30 and stud 33 into door releasing position to release the trigger controlled door 9' for upward swinging by its spring 12 into closed position. Such swinging of the trigger controlled door 9', will pull the latch rod 38 out of the ear 40, thus releasing the ear equipped door 9 for closing by its spring 12.

The pull rods 19 provide convenient means for opening the doors 9, 9' or said doors may be opened by hand. The treadle 26 is, of course, depressed by hand. The length of the casing 1 and height thereof is such that the doors 9, 9' when opened are spaced sufficiently from the treadle 26 to permit a small animal to clear the opened doors 9, 9' when the treadle is reached. The casing 1, doors 9, 9' and treadle 26 may be formed inexpensively of metal.

The foregoing will, it is believed, suffice to impart a clear understanding of our invention, without further explanation.

Manifestly, the invention, as described, is susceptible of modification, without departing from the inventive concept, and right is herein reserved to such modifications as fall within the scope of the appended claims.

What we claim is:

1. A trap comprising an elongated casing having a bottom, sides, an open top and ends, a lid closing said top, a pair of end doors hinged in the ends of the casing for swinging downwardly and inwardly into opening position and upwardly into closing position, spring means urging the doors toward closing position, a treadle adjacent the bottom of the casing, means at one side of the casing for retaining one door in down swung opening position rendered ineffective to retain the door in the latter position by downward movement of the treadle, means at the other side of the casing for retaining the other door in down swung opening position rendered ineffective by upward swinging of the first mentioned door, and a bait holder extending from one side of the casing over said treadle to suspend bait over the treadle intermediate the first and second mentioned retaining means.

2. A trap comprising an elongated casing having a bottom, sides, an open top and ends, a lid closing said top, a pair of end doors hinged in the ends of the casing for swinging downwardly and inwardly into opening position and upwardly into closing position, spring means urging the doors toward closing position, a treadle adjacent the bottom of the casing, means for retaining one door in down swung opening position rendered ineffective to retain the door in the latter position by downward movement of the treadle, and means for retaining the other door in down swung opening position rendered ineffective by upward swinging of the first mentioned door, the first means comprising a trigger, and a pull rod operatively connecting the treadle to the trigger.

3. A trap comprising an elongated casing having a bottom, sides, an open top and ends, a lid closing said top, a pair of end doors hinged in the ends of the casing for swinging downwardly and inwardly into opening position and upwardly into closing position, spring means urging the doors toward closing position, a treadle adjacent the bottom of the casing, means for retaining one door in down swung opening position rendered ineffective to retain the door in the latter position by downward movement of the treadle, and means for retaining the other door in down swung opening position rendered ineffective by upward swinging of the first mentioned door, the second mentioned means comprising an apertured lug on said other door, a guide on the bottom of the casing, and a latch rod pivoted on the first mentioned door and slidably and pivotally extended through said guide for endwise movement by swinging of said first mentioned door into and out of said lug.

4. A trap comprising an elongated casing having a bottom, sides, an open top and ends, a lid closing said top, a pair of end doors hinged in the ends of the casing for swinging downwardly and inwardly into opening position and upwardly into closing position, spring means urging the doors toward closing position, a treadle adjacent the bottom of the casing, means for retaining one door in down swung opening position rendered ineffective to retain the door in the latter position by downward movement of the treadle, means for retaining the other door in down swung opening position rendered ineffective by upward swinging of the first mentioned door, retractible latch members for the doors having end hooks, and means for retracting said latches swingable with the doors and including camming rods extending through one side of the casing and through said hooks with lateral camming portions thereon intermediate the ends thereof.

ARLEY G. BROOME.
HARRY S. MEANOR.

REFERENCES CITED

The following references are of record in the file of this patent:

UNITED STATES PATENTS

| Number | Name | Date |
|---|---|---|
| 122,061 | Robie | Dec. 19, 1871 |
| 1,024,278 | Niederlitz | Apr. 23, 1912 |
| 1,228,802 | Maxwell | June 5, 1917 |

FOREIGN PATENTS

| Number | Country | Date |
|---|---|---|
| 107,029 | Australia | Apr. 11, 1938 |